United States Patent
Hayashitani

(10) Patent No.: US 9,246,753 B2
(45) Date of Patent: Jan. 26, 2016

(54) METHOD AND DEVICE FOR PREDICTING AND DETERMINING FAILURE

(75) Inventor: Masahiro Hayashitani, Tokyo (JP)

(73) Assignee: NEC CORPORATION, Tokyo (JP)

( * ) Notice: Subject to any disclaimer, the term of this patent is extended or adjusted under 35 U.S.C. 154(b) by 131 days.

(21) Appl. No.: 14/006,784

(22) PCT Filed: Mar. 14, 2012

(86) PCT No.: PCT/JP2012/001764
§ 371 (c)(1),
(2), (4) Date: Sep. 23, 2013

(87) PCT Pub. No.: WO2012/127818
PCT Pub. Date: Sep. 27, 2012

(65) Prior Publication Data
US 2014/0010070 A1    Jan. 9, 2014

(30) Foreign Application Priority Data

Mar. 23, 2011 (JP) ................................ 2011-063539

(51) Int. Cl.
| | |
|---|---|
| H04L 12/28 | (2006.01) |
| H04L 12/24 | (2006.01) |
| H04B 3/46 | (2015.01) |
| H04B 17/309 | (2015.01) |
| H04B 17/336 | (2015.01) |
| H04W 24/08 | (2009.01) |
| H04B 17/29 | (2015.01) |
| H04B 17/318 | (2015.01) |
| H04B 17/373 | (2015.01) |

(52) U.S. Cl.
CPC .............. *H04L 41/0668* (2013.01); *H04B 3/46* (2013.01); *H04B 17/309* (2015.01); *H04B 17/336* (2015.01); *H04B 17/29* (2015.01); *H04B 17/318* (2015.01); *H04B 17/373* (2015.01); *H04W 24/08* (2013.01)

(58) Field of Classification Search
CPC .............................. H04L 41/0668; H04Q 7/20
See application file for complete search history.

(56) References Cited

U.S. PATENT DOCUMENTS

| | | |
|---|---|---|
| 6,141,532 A | 10/2000 | Mizuike et al. |
| 8,037,749 B2 | 10/2011 | Araki |
| 2005/0079886 A1* | 4/2005 | Niwano .................. 455/522 |

(Continued)

FOREIGN PATENT DOCUMENTS

| | | |
|---|---|---|
| JP | 11-168410 A | 6/1999 |
| JP | 2003-333124 A | 11/2003 |

(Continued)

OTHER PUBLICATIONS

International Search Report dated Apr. 17, 2012 with English translation thereof.

(Continued)

*Primary Examiner* — Anez Ebrahim
(74) *Attorney, Agent, or Firm* — McGinn IP Law Group, PLLC.

(57) ABSTRACT

A method and a device for predicting and determining a failure include a signal monitor that monitors the signal quality of each link, a signal quality prediction section that predicts future signal quality by using given forecast information and information on the monitored signal quality, and a failure prediction determination section that, depending on a degree of deterioration of the predicted signal quality with respect to a link, determines to bypass the link or to lower the symbol rate of the link.

17 Claims, 5 Drawing Sheets

(56) References Cited

U.S. PATENT DOCUMENTS

2009/0047943 A1 2/2009 Araki
2010/0172452 A1* 7/2010 Tota .............................. 375/345

FOREIGN PATENT DOCUMENTS

| JP | 2005-080001 A | 3/2005 |
| JP | 2007-37029 A | 2/2007 |
| JP | 2009-49593 A | 3/2009 |
| JP | 2010-239369 A | 10/2010 |

OTHER PUBLICATIONS

Japanese Office Action dated Nov. 4, 2015 with a partial English translation.

* cited by examiner

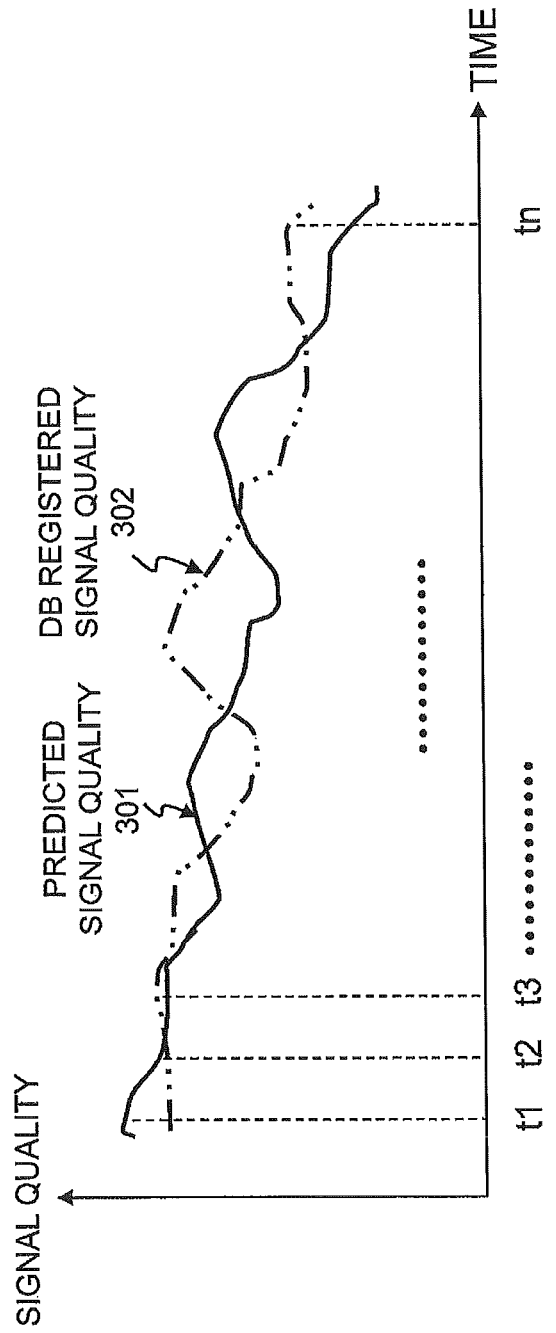

FIG. 4B

| TIME POINT | t1 | t2 | ... | tn | SUM |
|---|---|---|---|---|---|
| VALUE DIFFERENCE (ABSOLUTE VALUE) | a | b | | | a+b+... =V |
| DERIVATIVE DIFFERENCE (ABSOLUTE VALUE) | x | y | | | x+y+... =D |

DIFFERENTIAL = V + D

METHOD AND DEVICE FOR PREDICTING AND DETERMINING FAILURE

TECHNICAL FIELD

The present invention relates to a communication network system and, more particularly, to a method and a device for predicting and determining an occurrence of a failure.

BACKGROUND ART

In a communication network, it is necessary to always consider the possibility that data communication cannot be performed due to deterioration of signal quality, a failure in a transmission path, or the like. One of countermeasures thereto is a technology of recovery from a failure in which when a failure has occurred, data communication paths are changed, whereby communication is recovered.

In the technology of recovery from a failure, since paths are changed after a failure actually has occurred, there is a possibility that a communication interruption period will be long. Considering in particular the fact that applications requiring a broad band, such as super-high-quality moving image delivery, will appear in the future thanks to increasing network capacity, a large amount of data may be lost even during a very short-time communication interruption, and the influence of a communication interruption on applications can be very large. Accordingly, it is necessary to reduce a communication interruption period as short as possible, preparing for still increasing network capacity in the future.

For this reason, a method is proposed in which before a failure occurs, signal quality over a transmission path is predicted and data communication paths are changed, whereby a communication interruption period is minimized (PTL 1). According to PTL 1, utilizing the phenomenon that quality of radio signals deteriorates depending on the weather state (the amount of rainfall) in a radio network, deterioration of signal quality is predicted based on a forecasted rainfall, whereby paths can be changed before a failure actually occurs due to deterioration of signal quality.

Moreover, PTL 2 discloses a method in which a series of predictions and a historical pattern of past failures are correlated, whereby an occurrence of deterioration of transmission quality is determined in advance and transmission paths are changed.

CITATION LIST

Patent Literature

[PTL 1]
Japanese Patent Application Unexamined Publication No. 2009-049593
[PTL 2]
Japanese Patent Application Unexamined Publication No. H11-168410

SUMMARY OF INVENTION

Technical Problem

However, in the method disclosed in PTL 1, there are some occasions when a prediction comes out incorrect, because it is predicted that a failure will occur in a path when a forecasted rainfall exceeds a predetermined threshold value. When a prediction comes out incorrect, the consequence is that no failure actually has occurred even though paths have been changed based on the prediction that a failure will occur. Consequently, changes are redundantly made in the network and network resources are redundantly used, so that efficient use of the network resources is inhibited.

Moreover, according the method disclosed in PTL 2, deterioration of transmission quality can be predicted more correctly by referring to past patterns at the time of failure. However, a prediction can always come out incorrect, and there still is a high possibility that an incorrect prediction will result in a redundant change of transmission path.

In other words, in the methods as disclosed in PTLs 1 and 2, when deterioration of transmission quality is predicted, since the countermeasure is only a change of transmission path, it is difficult to prevent a redundant change to occur.

Accordingly, an object of the present invention is to provide a method and a device for predicting and determining a failure that can suppress a redundant change of path due to prediction of a failure and can achieve efficient use of network resources, while maintaining the reliability of a network.

Solution to Problem

A device for predicting and determining a failure according to the present invention is a device for predicting and determining a failure provided to a node of a communication network, characterized by comprising: signal monitor means for monitoring signal quality of each of links connected to the node; signal quality prediction means for predicting future signal quality of a link by using given forecast information and information on signal quality monitored with respect to the link; and determination means for determining to bypass the link or to lower symbol rate of the link, depending on a degree of deterioration of the predicted signal quality with respect to the link.

A method for predicting and determining a failure according to the present invention is a method for predicting and determining a failure in a node of a communication network, characterized by comprising: by signal monitor means, monitoring signal quality of each of links connected to the node; by signal quality prediction means, predicting future signal quality of a link by using given forecast information and information on signal quality monitored with respect to the link; and by determination means, determining to bypass the link or to lower symbol rate of the link, depending on a degree of deterioration of the predicted signal quality with respect to the link.

Advantageous Effects of Invention

According to the present invention, it is possible to suppress a redundant change of path due to prediction of a failure and to achieve efficient use of network resources, while maintaining the reliability of a network.

BRIEF DESCRIPTION OF DRAWINGS

FIG. 4A is a graph for describing comparison of predicted data and registered data in a failure information database in the present exemplary embodiment.

FIG. 4B is a schematic diagram showing in a table format a series of data for describing calculation of a differential.

DESCRIPTION OF EMBODIMENTS

According to the present invention, a plurality of levels are provided for failure prediction, and in a failure prediction state that does not lead to bypassing of a link, a notification to lower the symbol rate of communication is generated. Since the immunity of a signal is increased by lowering the symbol rate, it is possible to handle some extent of signal deterioration. That is, bypassing of a link is notified when it is predicted that a signal will greatly deteriorate, but lowering of symbol rate is notified when it is predicted that some extent of deterioration will occur, whereby it is possible to handle levels of signal deterioration and to further reduce the possibility of a redundant change caused by a missed prediction. Hereinafter, an exemplary embodiment of the present invention will be described in detail.

1. Exemplary Embodiment 1.1) Configuration

Figure 1:
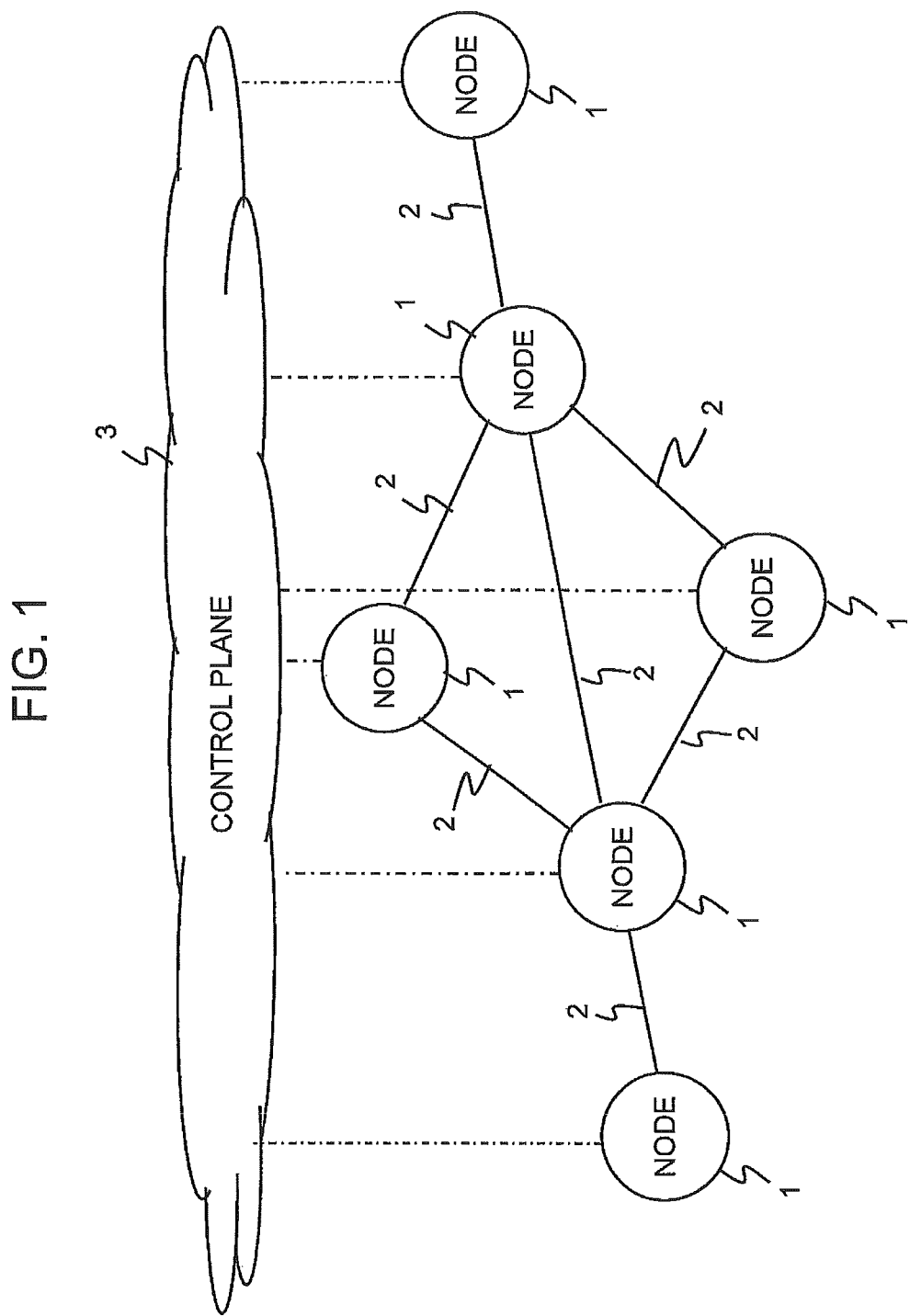
FIG. 1 is a schematic diagram showing an example of a network in which nodes provided with a failure prediction and determination device according to an exemplary embodiment of the present invention are connected.

As shown in FIG. 1, in a network including a plurality of nodes 1, each node is mutually connected to a neighboring node through a link 2 and is also connected to a control plane 3. Each node 1 is a communication device that performs transmission/reception and relay of data, and the nodes are connected through the links 2 that serve as transmission paths. It does not matter whether the link 2 is wired or wireless. For example, the link 2 may be an optical transmission path transmitting an optical signal, or may be a radio link transmitting a radio signal.

Each node 1 is provided with a failure prediction and determination device according to the present exemplary embodiment, which will be described later, and receives forecast information such as a weather forecast and a disaster forecast from the control plane 3 and notifies the control plane 3 of a result of failure prediction performed by the node 1 based on the forecast information. However, what the nodes 1 are connected to is not necessarily the control plane 3, but may be any network as long as forecast information and results of failure prediction can be exchanged with it.

Figure 2:
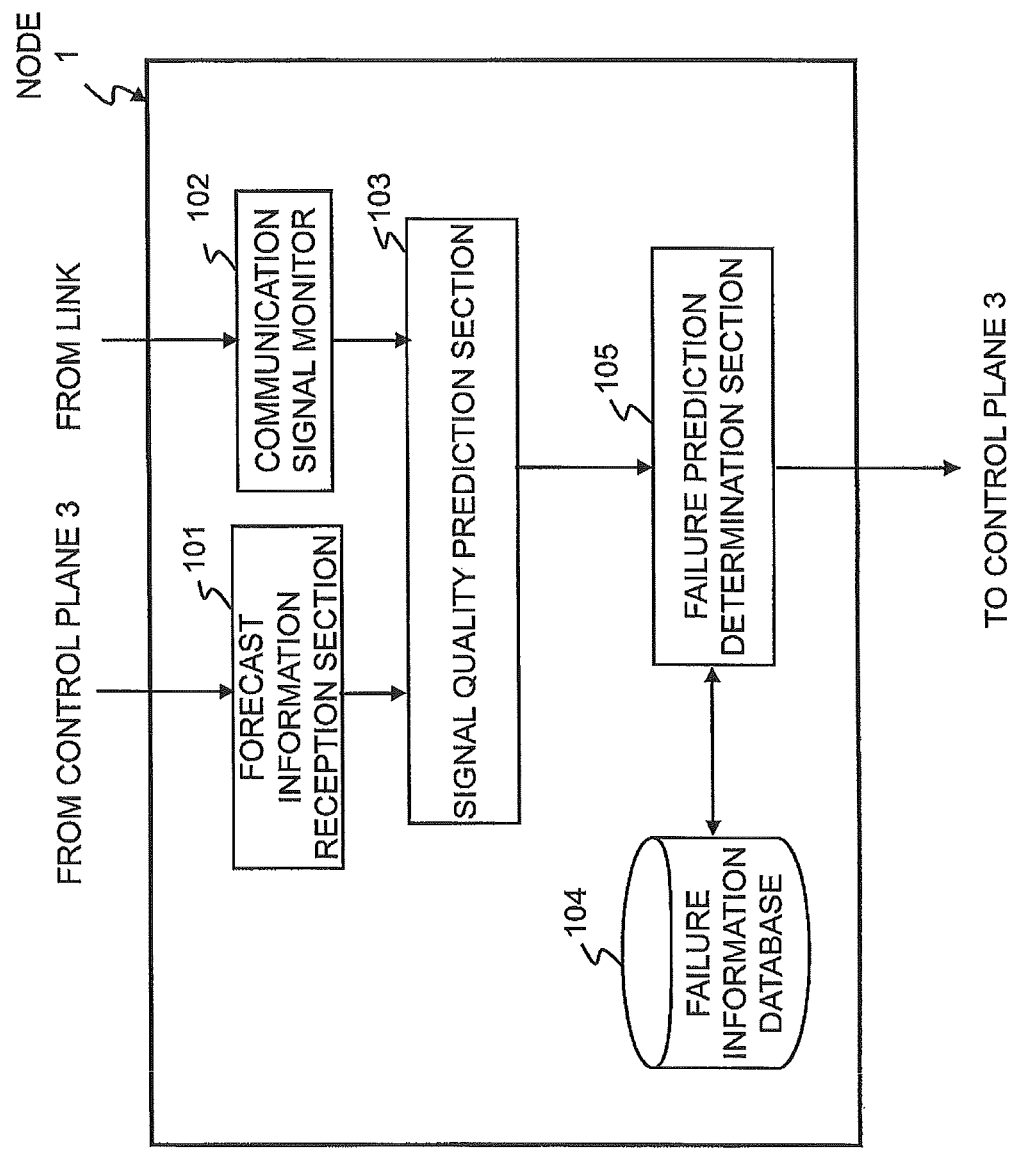
FIG. 2 is a block diagram showing a configuration of a node provided with the failure prediction and determination device according to the present exemplary embodiment.

As shown in FIG. 2, the failure prediction and determination device provided to each node 1 includes a forecast information reception section 101, a communication signal monitor 102, a signal quality prediction section 103, a failure information database 104, and a failure prediction determination section 105.

The forecast information reception section 101 receives from the control plane 3 forecast information concerning an item affecting the signal quality of a link 2. The communication signal monitor 102 monitors the signal quality of each link connected to the node 1. The communication signal monitor 102 may be provided outside the node, and a plurality of items may be monitored for signal quality. For example, a plurality of items including S/N radio (Signal to Noise ratio) and signal intensity can also be monitored.

The signal quality prediction section 103 predicts signal quality up to certain time, by using the forecast information from the forecast information reception section 101 and information on the signal quality from the communication signal monitor 101. The failure information database 104 accumulates information indicating how signal quality had varied before a failure occurred in the past, with respect to each link connected to the node 1.

The failure prediction determination section 105 determines the possibility, at a plurality of levels, of occurrence of a failure in a link of interest by comparing information on the signal quality predicted by the signal quality prediction section 103 with the past failure information (information on signal quality variations over time leading up to an occurrence of a failure) stored in the failure information database 104, and notifies a result of the determination to the control plane 3. When the certainty of a failure occurrence is high to some extent, a notification of failure occurrence prediction is made to the control plane 3, but when an occurrence of a failure is not very likely, a notification of lowering of symbol rate is made to the control plane 3, which will be described specifically later.

Note that the functions of the signal quality prediction section 103 and the failure prediction determination section 105 also can be implemented by executing programs stored in a memory (not shown) on a program-controlled processor (not shown) such as CPU (Central Processing Unit) controlling the entire operation of the node 1. Hereinafter, operation according to the present exemplary embodiment will be described.

1.2) Operation

Next, a method for predicting and determining a failure according to the present exemplary embodiment will be described with reference to a flowchart shown in FIG. 3.

Figure 3:
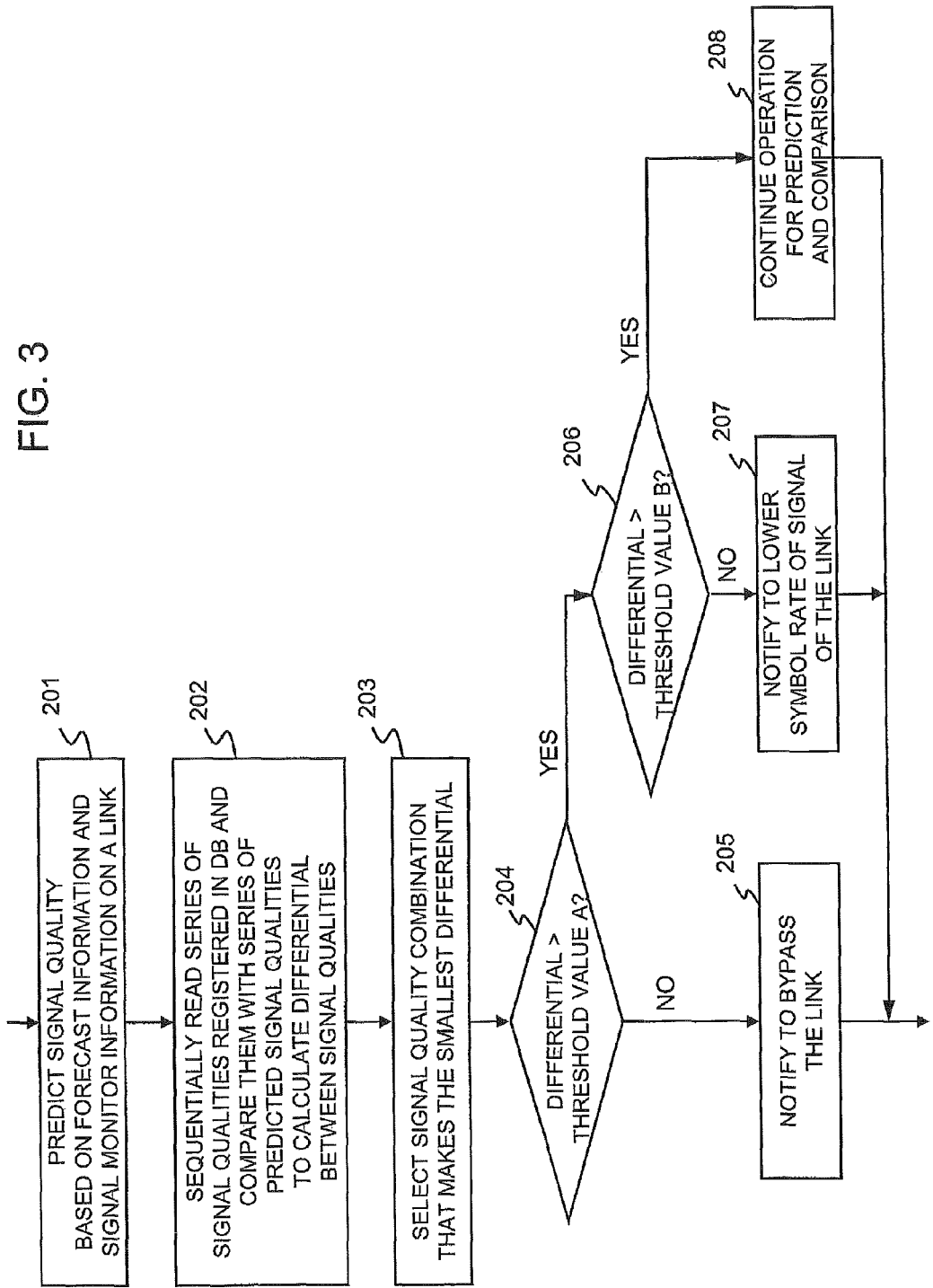
FIG. 3 is a flowchart showing a method for predicting and determining a failure according to the present exemplary embodiment.

Referring to FIG. 3, the signal quality prediction section 103 receives as inputs forecast information and signal quality information on each link from the prediction information reception section 101 and the communication signal monitor 102, respectively, and predicts signal quality for a link of interest (Step 201). Here, the signal quality includes S/N ratio and the like, but the quality of an optical signal includes PMD (Polarization Mode Dispersion), S/N ratio, and the like. The forecast information is information about a weather forecast, a disaster forecast, and the like that will affect the signal quality of a link, including the amount of rainfall in case of a radio signal, and wind, an earthquake, and the like in case of an optical signal (as an optical signal has a higher rate, the quality thereof is more affected by such weather conditions). The signal quality prediction section 103 grasps a current signal quality state based on the signal quality information from the communication signal monitor 102, predicts signal quality up to certain time based on the forecast information from the prediction information reception section 101, and outputs predicted signal quality information to the failure prediction determination section 105. It is assumed that the prediction of signal quality is performed for each link in parallel.

The failure prediction determination section 105, upon receiving as an input the predicted signal quality information up to certain time from the signal quality prediction section 103, compares each piece of signal quality information accumulated in the failure information database 104 with the predicted signal quality information to calculate a differential in signal quality (Step 202).

Here, the failure information database 150 retrieves signal quality information leading up to an occurrence of a failure in the past, with respect to the link of the predicted signal quality. If an enormous amount of signal quality information is registered, targets for comparison may be restricted by setting a parameter. A method for calculating the differential is as follows.

Referring to FIG. 4A, a curve 301 depicted by a solid line represents predicted signal quality, and a curve 302 depicted by a dashed-two dotted line represents registered signal quality accumulated in the failure information database 104. For signal quality, it is assumed that n comparisons from time point t1 to tn are performed. In this case, as shown in FIG. 4B, a difference in value and a difference in differential coefficient between the predicted signal quality 301 and the registered signal quality 302 are obtained, and the respective n absolute values are added respectively. The reason for using the absolute values of the differences is to avoid cancelling out the differences when they are added. A sum V of a time series of the differences in value (a, b, . . . ) and a sum D of a time series of the differences in differential coefficient (x, y, . . . ) are added up, thereby calculating the differential.

Referring back to FIG. 3, when the differential between the predicted signal quality and the registered signal quality in the failure information database 104 has been thus calculated, the failure prediction determination section 105 extracts a signal quality combination making the smallest differential (Step 203). That is, referring to the graph of FIG. 4A, from the failure information database 104, a registered signal quality 302 is selected that makes the smallest differential with the predicted signal quality 301.

Subsequently, the failure prediction determination section 105 compares this smallest differential with two threshold values A and B (A<B) to change the description of a notification to the control plane 3.

First, the failure prediction determination section 105 determines whether or not the differential is larger than the threshold value A (Step 204). When the differential is not larger than the threshold value A (NO at Step 204), it can be predicted that the predicted signal quality will follow a process similar to the signal quality accumulated in the failure information database 104, resulting in a failure occurring. Therefore, the failure prediction determination section 105 notifies the control plane 3 to bypass the monitored link (Step 205).

When the differential exceeds the threshold value A (YES at Step 204), the failure prediction determination section 105 determines whether or not the differential is larger than the other threshold value B (Step 206). When the differential is not larger than the threshold value B (NO at Step 206), it is predicted that deterioration of a signal in the link of interest will occur although there is no high possibility of an occurrence of a failure in future, and the failure prediction determination section 105 notifies the control plane 3 to lower the symbol rate of the signal (Step 207). Since the immunity of the signal is increased by lowering the symbol rate, it is possible to handle signal deterioration to some extent. In case where this link is an optical transmission path, the failure prediction determination section 105 may notify to transmit the optical path over a plurality of channels if the bit rate of the optical path is decreased due to the lowered symbol rate in a system in which a plurality of optical paths are multiplexed based on WDM (Wavelength Division Multiplexing), TDM (Time Division Multiplexing), or the like.

When the differential exceeds the threshold value B (YES at Step 206), the failure prediction determination section 105 determines that no failure will occur soon in future, and continues the operation for prediction (Step 208).

Note that if a plurality of items are monitored for signal quality, the failure prediction determination section 105 performs the determination of comparison between the differential and the threshold values A and B, with respect to all or part of the plurality of items. It also can be decided, depending on the service in a network link, whether the determination is performed with respect to all of the plurality of items, or part thereof.

1.3) Effects

As described above, according to the present exemplary embodiment, a node in a network predicts signal quality by using the weather forecast information and the communication signal monitor information, compares it with signal quality accumulated in the database to calculate a differential, and based on the differential, determines whether a failure is predicted or whether the way of lowering symbol rate can be used. Bypassing of a link is notified when a signal greatly deteriorates, but lowering of symbol rate is notified when a signal deteriorates to some extent, whereby it is possible to handle levels of signal deterioration and to reduce the possibility of a redundant change caused by a missed prediction.

In an optical communication system in particular, a plurality of threshold values are provided to deal with the characteristics of a high-speed optical signal, whereby it is possible to further reduce the possibility of a missed prediction. Accordingly, it is possible to use network resources efficiently, while maintaining the reliability of an optical fiber network.

INDUSTRIAL APPLICABILITY

The present invention is applicable to a communication network having a function of predicting and avoiding a failure.

REFERENCE SIGNS LIST

1 Node
2 Link
3 Control plane
101 Forecast information reception section
102 Communication signal monitor
103 Signal quality prediction section
104 Failure information database
105 Failure prediction determination section

The invention claimed is:

1. A device for predicting and determining a failure, wherein the device is provided to a node of a communication network, the device comprising:
  a signal monitor for monitoring signal quality of each of links connected to the node;
  a signal quality prediction section for predicting future signal quality of a link by using given forecast information and information on the signal quality monitored with respect to the link;
  and a determination section for determining to bypass the link or to lower a symbol rate of the link, depending on a degree of a deterioration of the predicted signal quality with respect to the link;
  an accumulation section for accumulating signal quality information concerning failures occurring in each of the links in a past, wherein the determination section calculates a differential between the predicted signal quality information and a piece of the accumulated signal quality information that is closest to the predicted signal quality information among the accumulated signal quality information, and depending on a size of the differential, determines to bypass the link or to lower the symbol rate.

2. The device according to claim 1, wherein the determination section determines to bypass the link when the size of the differential is not larger than a first threshold value, and determines to lower the symbol rate of a signal transmitting the link when the size of the differential is larger than the first threshold value and is not larger than a second threshold value.

3. The device according to claim 1, wherein the determination section determines to bypass the link when the signal quality prediction section predicts that the signal quality will deteriorate to a predetermined amount.

4. The device according to claim 3, wherein the determination section determines to lower the symbol rate of the link when the signal quality prediction section predicts that the signal quality will deteriorate less than the predetermined amount.

5. The device according to claim 1, further comprising:
an accumulation section for accumulating signal quality information concerning failures occurring in each of the links in a past,
wherein the determination section calculates a differential between the predicted signal quality information and a piece of the accumulated signal quality information that is closest to the predicted signal quality information among the accumulated signal quality information, and determines to bypass the link when a size of the differential is not larger than a threshold value.

6. The device according to claim 1, further comprising:
an accumulation section for accumulating signal quality information concerning failures occurring in each of the links in a past,
wherein the determination section calculates a differential between the predicted signal quality information and a piece of the accumulated signal quality information that is closest to the predicted signal quality information among the accumulated signal quality information, and determines to lower the symbol rate of a signal transmitting the link when a size of the differential is larger than a first threshold value and is not larger than a second threshold value.

7. A method for predicting and determining a failure in a node of a communication network, the method comprising:
monitoring signal quality of each of links connected to the node;
predicting future signal quality of a link by using given forecast information and information on the signal quality monitored with respect to the link;
and determining to bypass the link or to lower symbol rate of the link, depending on a degree of deterioration of the predicted signal quality with respect to the link;
accumulating signal quality information concerning failures occurring in each of the links in a past;
calculating a differential between the predicted signal quality information and a piece of the accumulated signal quality information that is closest to the predicted signal quality information among the accumulated signal quality information, wherein to bypass the link or to lower the symbol rate is determined depending on a size of the differential.

8. The method according to claim 7, wherein to bypass the link is determined when the size of the differential is not larger than a first threshold value, and to lower the symbol rate of a signal transmitting the link is determined when the size of the differential is larger than the first threshold value and is not larger than a second threshold value.

9. The method according to claim 7, wherein said determining to bypass the link or to lower the symbol rate of the link includes bypassing the link when said predicting the future signal quality of the link predicts that the signal quality will deteriorate to a predetermined amount.

10. The method according to claim 9, wherein said determining to bypass the link or to lower the symbol rate of the link includes lowering the symbol rate of the link when said predicting the future signal quality of the link predicts that the signal quality will deteriorate less than the predetermined amount.

11. The method according to claim 7, further comprising:
accumulating signal quality information concerning failures occurring in each of the links in a past;
calculating a differential between the predicted signal quality information and a piece of the accumulated signal quality information that is closest to the predicted signal quality information among the accumulated signal quality information,
wherein to bypass the link is determined when a size of the differential is not larger than a threshold value.

12. The method according to claim 7, further comprising:
accumulating signal quality information concerning failures occurring in each of the links in a past;
calculating a differential between the predicted signal quality information and a piece of the accumulated signal quality information that is closest to the predicted signal quality information among the accumulated signal quality information,
wherein to lower the symbol rate of a signal transmitting the link is determined when a size of the differential is larger than a first threshold value and is not larger than a second threshold value.

13. A program, embedded in a non-transitory storage medium, causing a program-controlled processor provided to a node of a communication network to function as a device to perform a method for predicting and determining a failure, the method comprising:
monitoring signal quality of each of links connected to the node;
predicting future signal quality of a link by using given forecast information and information on the signal quality monitored with respect to the link;
and determining to bypass the link or to lower symbol rate of the link, depending on a degree of deterioration of the predicted signal quality with respect to the link;
accumulating signal quality information concerning failures occurring in each of the links in a past;
calculating a differential between the predicted signal quality information and a piece of the accumulated signal quality information that is closest to the predicted signal quality information among the accumulated signal quality information, wherein to bypass the link or to lower the symbol rate is determined depending on a size of the differential.

14. The program according to claim 13, wherein to bypass the link is determined when the size of the differential is not larger than a first threshold value, and to lower the symbol rate of a signal transmitting the link is determined when the size of the differential is larger than the first threshold value and is not larger than a second threshold value.

15. The program according to claim 13, wherein said determining to bypass the link or to lower the symbol rate of the link includes:
bypassing the link when said predicting the future signal quality of the link predicts that the signal quality will deteriorate to a predetermined amount; and
lowering the symbol rate of the link when said predicting the future signal quality of the link predicts that the signal quality will deteriorate less than the predetermined amount.

16. The program according to claim 13, further comprising:
- accumulating signal quality information concerning failures occurring in each of the links in a past; and
- calculating a differential between the predicted signal quality information and a piece of the accumulated signal quality information that is closest to the predicted signal quality information among the accumulated signal quality information,
- wherein to bypass the link is determined when a size of the differential is not larger than a threshold value.

17. The program according to claim 13, further comprising:
- accumulating signal quality information concerning failures occurring in each of the links in a past; and
- calculating a differential between the predicted signal quality information and a piece of the accumulated signal quality information that is closest to the predicted signal quality information among the accumulated signal quality information,
- wherein to lower the symbol rate of a signal transmitting the link is determined when a size of the differential is larger than the first threshold value and is not larger than a second threshold value.

* * * * *